(No Model.)

R. ZEPPENFIELD.
CAR AXLE BOX.

No. 272,508. Patented Feb. 20, 1883.

Attest:
Saml. V. Boyd
Thos. L. Jones.

Inventor:
Robert Zeppenfield
by C. D. Moody
atty

UNITED STATES PATENT OFFICE.

ROBERT ZEPPENFIELD, OF ST. LOUIS, MISSOURI.

CAR-AXLE BOX.

SPECIFICATION forming part of Letters Patent No. 272,508, dated February 20, 1883.

Application filed December 22, 1882. (No model.)

*To all whom it may concern:*

Be it known that I, ROBERT ZEPPENFIELD, of St. Louis, Missouri, have made a new and useful Improvement in Railway-Car Oil-Boxes, of which the following is a full, clear, and exact description, reference being had to the annexed drawings, making part of this specification, in which—

Figure 1:
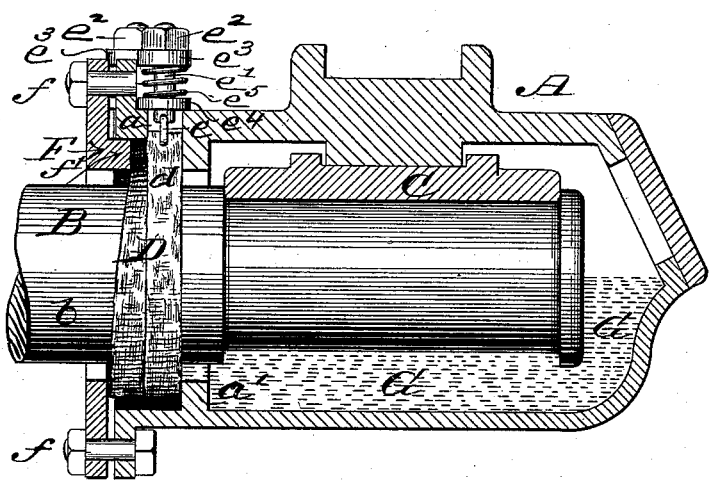
Figure 2:
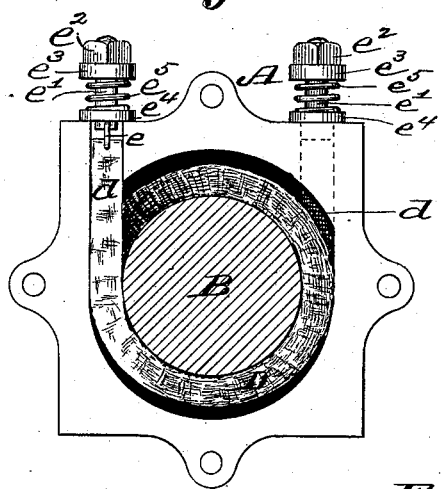
Figure 3:
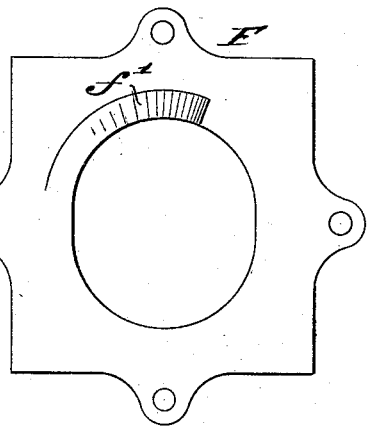
Figure 4:

Figure 1 is a longitudinal section taken through the improved box; Fig. 2, an elevation of the inner end of the box, the follower used to confine the packing being removed; Fig. 3, an elevation from the inner side of the follower, and Fig. 4 an edge view of the follower.

The same letters denote the same parts.

The present invention relates to the mode of packing the box at its inner end.

A, Figs. 1 and 2, represents the oil-box of a railway-car axle. Saving the improvement in question, the box is of the usual description.

B represents the car-axle, and C the journal-box, also of the customary form. The car-axle and oil-box are also relatively arranged in the ordinary manner. In place, however, of the usual guard-plates upon the shoulder $b$ of the axle a packing-strip, D, preferably in the form of what is termed "square packing," is used. This packing-strip serves to keep the dirt, grit, and dust from entering the oil-box, but more especially to prevent the oil from escaping from the box. To this end the packing-strip is wrapped around the axle, substantially as shown, and its ends $d\ d$ extended outward therefrom and connected with devices suited for drawing, or for enabling the ends $d\ d$ to be drawn, and the packing thereby tightened around the axle.

A convenient form of tightening device is that shown, the ends $d\ d$ of the packing-strip, by means of the links $e\ e$, being connected with the bolts $e'\ e'$, which in turn are provided with the heads or nuts $e^2\ e^2$, the washers $e^3\ e^4$, and the springs $e^5\ e^5$. The washers $e^4\ e^4$ bear upon the oil-box, and the springs at one end bear upon the washers $e^4\ e^4$ and at the other end against the washers $e^3\ e^3$, and act to lift the bolts and draw the packing around the axle. The springs are under sufficient tension to continue for a considerable period to tighten the packing as it wears away or stretches, and by tightening the nuts $e^2\ e^2$ upon the bolts the springs can be readjusted. The springs might be made to bear directly upon the oil-box and against the heads or nuts $e^2\ e^2$. The oil-box is suitably shaped or perforated, as at $a\ a$, to provide for connecting the packing-strip and bolts $e'\ e'$.

To prevent the dirt or oil from passing the outer side of the packing, the latter is pressed laterally against a shoulder or flange, $a'$, with which the oil-box is provided. The lateral pressure upon the packing is obtained by means of the follower F, the follower being drawn against the packing by means of the bolts $f\ f$, which connect with the oil-box.

To enable the follower to bear all around against the packing, it is furnished with a projection, $f'$, which comes against that portion of the packing-coil which lies farther within the oil-box. The flange $a'$ may have a similar projection for a similar purpose.

The present improvement is advantageous, not only in that thereby the oil-box is very effectually packed, but also in that it enables the waste commonly used in oil-boxes to be dispensed with and oil, G, only to be introduced into the oil-box.

I claim—

1. The combination of the oil-box A, the car-axle B, the packing D, the bolts $e'\ e'$, the nuts $e^2\ e^2$, and the springs $e^5\ e^5$, substantially as described.

2. The combination of the oil-box A, the car-axle B, the packing D, and the follower F, substantially as described.

3. The combination of the oil-box A, the car-axle B, the packing D, the tightening device $e'\ e'\ e^2\ e^2\ e^5\ e^5$, and the follower F, substantially as described.

ROBERT ZEPPENFIELD.

Witnesses:
C. D. MOODY,
SAML. S. BOYD.